Oct. 6, 1959
H. H. HAAS ET AL
2,907,891
ENGINE STARTING SYSTEM
Filed Sept. 24, 1956
3 Sheets-Sheet 1
FIG.1.
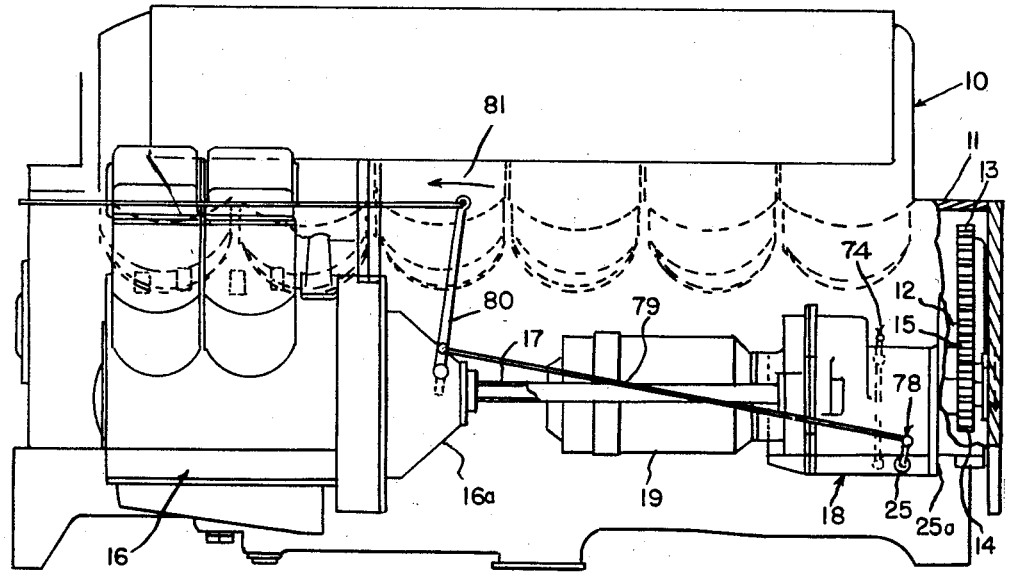
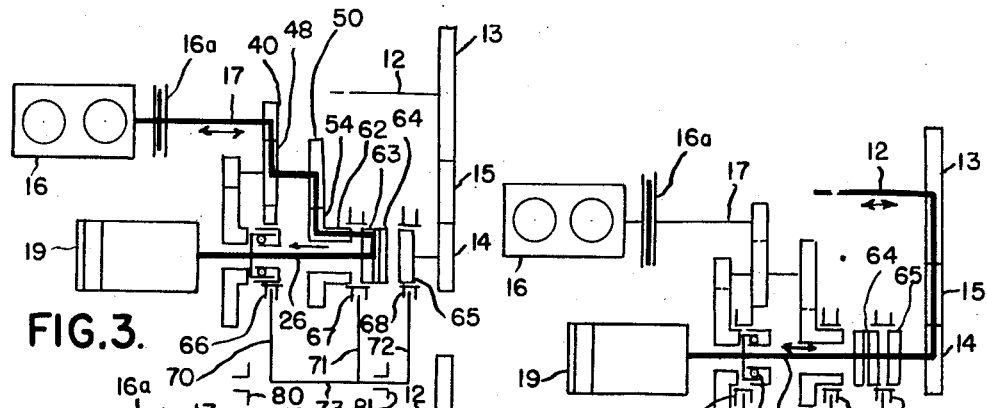
FIG.3.
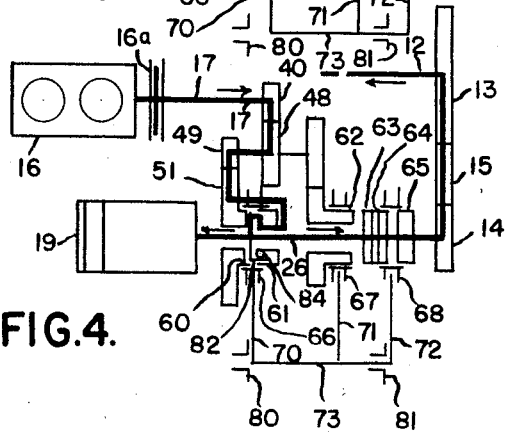
FIG.4.
FIG.5.
INVENTORS
HERBERT H. HAAS
BY RICHARD C. ALAND
ATTORNEYS

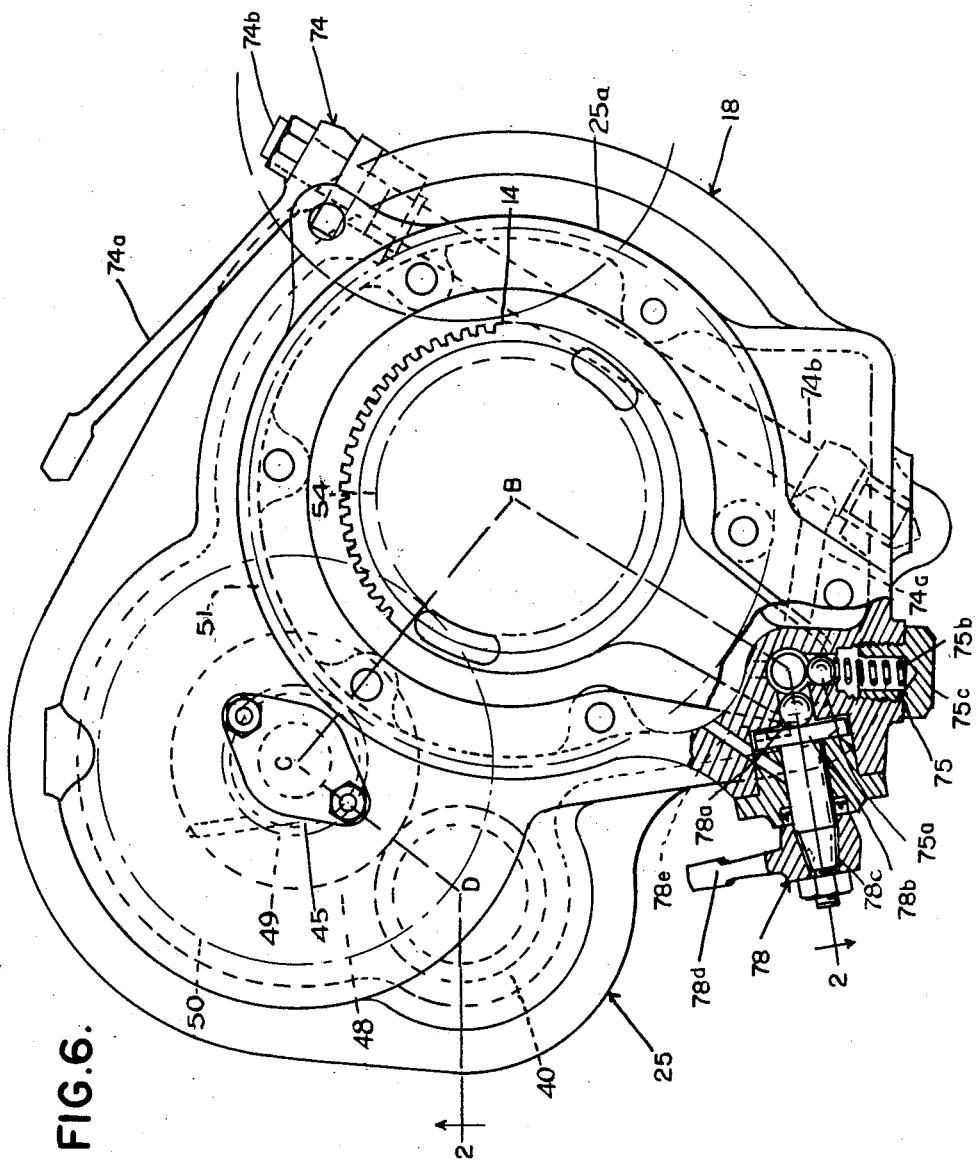

United States Patent Office 2,907,891
Patented Oct. 6, 1959

2,907,891
ENGINE STARTING SYSTEM

Herbert H. Haas, Royal Oak, and Richard C. Aland, Detroit, Mich., assignors, by mesne assignments, to Continental Motors Corporation, Muskegon, Mich., a corporation of Virginia Application September 24, 1956, Serial No. 611,456

7 Claims. (Cl. 290—4)

Our invention relates to internal combustion engine starting systems and more particularly to starting systems for large compression ignition type engines and utilizing a small auxiliary internal combustion engine to start the large engine. More particularly still, our invention relates to a multiple function starter-generator drive system having a multiple function transmission.

Heavy duty engines of the diesel type are conventionally difficult to start when cold, the usual electric starter used with spark ignition engines being of insufficient capacity for this purpose.

An object of our invention is to provide for effective starting of a compression ignition engine by connecting an internal combustion starter engine and an electric starter-generator to each other and to the main engine crankshaft through a multiple function transmission.

Another object of the invention is to increase the utility of a starting system by providing a transmission selectively drivingly connecting the diesel engine crankshaft, a starter engine, and an electric starter generator in such a manner that the starter-generator may start the starter engine or the diesel engine when warm, either engine may drive the starter-generator, or the starter engine may crank the diesel engine.

For a more complete understanding of our invention, reference may be had to the accompanying drawings illustrating a preferred embodiment of the invention in which like characters, refer to like parts throughout the several views and in which Fig. 1 is a side elevational view of an engine utilizing the starting system of the invention.

Figs. 3, 4 and 5 are diagrammatic views of the starting system illustrating the operation thereof, and Fig. 6 is an end view of the starter mechanism partly in section, and as seen substantially from the right side of Fig. 1, being the flywheel end of the engine.

Figure 2:
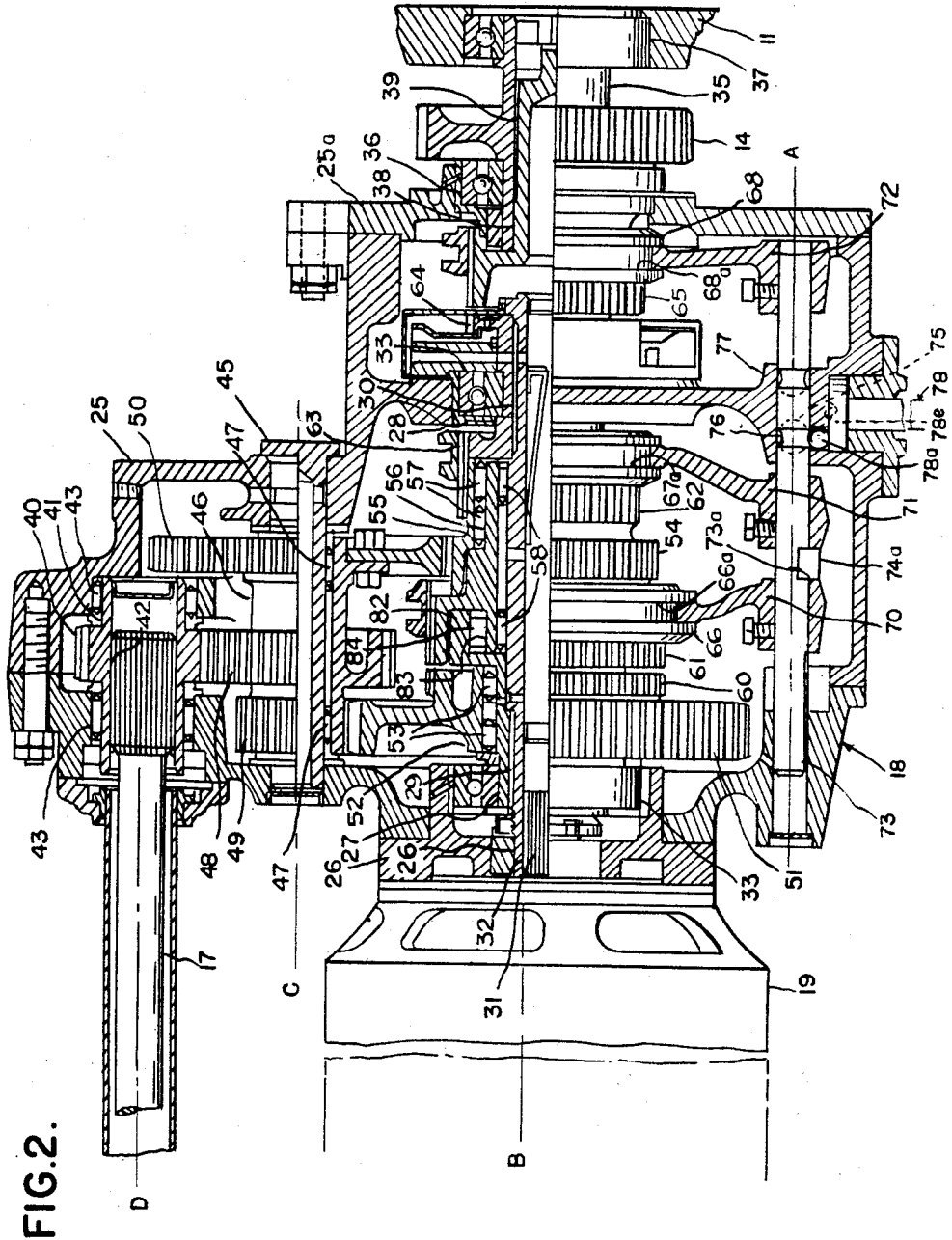
Fig. 2 is a view partially in cross-section and partially in elevation of the starting transmission taken substantially on the axis center points A, B, C, D indicated by the line 2—2 of Fig. 6.

In Fig. 1, a preferred compression ignition type engine 10 is illustrated as having a crankcase 11 and a crankshaft 12 provided with a flywheel gear 13. A starter gear 14 is connected to the gear 13 preferably through an intermediate reduction or idler gear 15, the reduction ratio between gears 13 and 14 preferably being about 2.6 to 1.

An auxiliary internal combustion starter engine 16 provided with a conventional disc type clutch mechanism 10a is preferably mounted on the side of the engine 10 and has a drive shaft 17 which is engaged or disengaged from the starter engine 16 by means of the clutch 16a. A starter transmission assembly 18 is mounted on the engine 10 and supports an electric starter-generator 19. The transmission assembly 18 is provided for selectively drivingly interconnecting the starter engine 16, the starter-generator 19, and the starting gear 14 as will be described.

The transmission assembly 18 comprises a two-part housing 25 provided with an end plate 25a. A transmission driveshaft 26 is secured in hollow clutch shafts 27 and 28 by any means such as splines 29 and 30 respectively and is also secured at one end on the driveshaft 31 of the starter-generator 19 preferably by splines as at 32. The clutch shafts 27 and 28, supporting the driveshaft 26, are rotatably mounted in the housing 25 by bearing assembly 33.

The starter gear 14 is provided with a hollow shaft 35 which is rotatably supported by the housing and plate 25a and the crankcase 11 in bearings 36 and 37 respectively. A clutch shaft 38 is secured in the starter gear shaft 35 preferably by splines as at 39, and is axially aligned with the transmission driveshaft 26.

A gear 40 having a hollow shaft 41 is secured by splines 42 to the end of the starter engine drive shaft 17 and is rotatably supported in the housing 25 by bearings 43. A lay shaft 45 supported in the housingf 25 rotatably carries a hollow gear shaft 46 by means of bearings 47. The gear shaft is provided with a gear 48, a gear 49, and a gear 50, gear 48 being drivingly engaged with the gear 40 secured to the starter engine drive shaft 17. Gear 49 is engaged with a gear 51 provided with a hollow shaft 52 rotatably supported on the clutch shaft 27 by bearings 53. Gear 50 is engaged with a gear 54 provided with a hollow shaft 55 rotatably supported on an intermediate hollow clutch shaft 56 by bearings 57. The clutch shaft 56 is in turn rotatably supported on the transmission driveshaft 26 by bearings 58.

The gear shaft 52 is provided with a gear portion 60, the clutch shaft 56 is provided with a gear portion 61, the gear shaft 55 is provided with a gear portion 62, the clutch shaft 28 is provided with gear portions 63 and 64, and the clutch shaft 38 is provided with a gear portion 65.

All of the aforesaid shafts having gear portions are axially aligned, as may be seen in Fig. 2, and adjacent gear portions are adapted to be connected and disconnected through actuation of three axially slidable clutch members, namely member 66, member 67 and member 68, which are respectively provided with annular grooves 66a, 67a, and 68a. Clutch actuating arms 70, 71 and 72 are respectively engaged in grooves 66a, 67a and 68a, and are mounted on a rod 73 which is axially slidably carried in the housing 25 and may be operated by any suitable means such as a conventional gear shift mechanism 74, as shown in Fig. 6. Gear shift mechanism 74 comprises and actuating arm 74a operably connected to a shaft 74b which extends into the housing 25 and operates to turn a lever 74c which is engaged in a slot 73a provided in the rod 73. Movement of the lever 74c thus shifts the rod 73 longitudinally between two extreme positions.

In the clutch position shown in Fig. 2, the rod 73 is retained by a spring-loaded pawl mechanism 75 engaged in an annular detent 76. The pawl mechanism 75, as shown in Fig. 6, preferably comprises a pawl 75a and a spring 75b retained in the housing 25 by any means such as plug 75c. When the rod 73 is shifted to the left, the pawl 75 will engage in a second annular detent and the arms 70 and 72 will be thus limited in their movement to these two positions of pawl engagement.

An interlock mechanism 78 is provided to prevent the rod 73 from shifting when the starter engine 16 is engaged with the transmission assembly 18. As shown in Figs. 2 and 6, the interlock mechanism comprises a ball lock 78a adapted to engage in either of the annular detents 76 or 77, depending on the position of the rod 73. The ball lock 78a is retained in the detent 76 by a plate 78b mounted on the end of a rotatable shaft 78c. A lever 78d secured to the shaft 78c operates to rotate the shaft 78e and its plate 78b. A groove 78c is provided in the face of the plate 78b, and when the plate 78b is rotated appropriately, the ball 78a will drop into the groove 78c and out of the detent 76 or 77, permitting the rod 73 to be shifted. The lever 78d is connected by means of a rod 79, as shown in Fig. 1, or by any other suitable means, to a clutch lever 80, as illustrated in Fig. 1, which operates the clutch 16a.

When the clutch lever is moved in the direction indicated by the arrow 81, disengaging the clutch 16a, the lever 78d will rotate the shaft 78c, disengaging the ball 78a from the detent 76 or 77, permitting the transmissions 18 to be shifted. When the clutch 16a is engaged, the lever 78d will rotate the shaft 78c in the other direction, engaging the ball 78a in the detent 76 or 77, locking the rod 73. This prevents shifting of the transmission 18 except when the clutch 16a is released.

The clutch shaft 27 is provided with an outer race member 82, and the clutch shaft 56 is provided with an inner race member 83, between which operates a one-way overrunning clutch 84, which disengages when the rotation of the clutch shaft 27 splined to the driveshaft 26, overruns the rotation of the clutch shaft 56.

The selective operation of the transmission 18 may be seen by referring to the diagrammatic views of Figs. 3, 4 and 5. Fig. 3 represents the clutch position shown in Fig. 2; namely, clutches 66 and 68 are disengaged while the clutch 67 engages the gear portions 62 and 63 of the respective shafts 55 and 28. The heavy line in Fig. 3 indicates the consequent two-way driving connection from the starter engine 16 to the starter-generator 19; from the gear 40 splined to the starter engine shaft 17, through the gear 54, from the gear portion 62 through the clutch 67 to the gear portion 63 of the clutch shaft 28 which in turn is splined to the transmission drive shaft 26 connected to the starter-generator.

Clutch 68 being in a disconnected position, effects a disengagement of the crankshaft 12 from the transmission. Thus, the starter-generator 19 may be utilized for starting the starter engine 16, or the starter engine 16 may drive the starter generator 19, as indicated by the two-way directional arrows in Fig. 3.

With the starter engine 16 running, the clutch 16a may be disengaged, releasing the interlock mechanism 78. The rod 73 may then be shifted to the left, carrying the arms 70, 71 and 72 to the left for actuating all three clutches 66, 67 and 68 to their second position as indicated in Fig. 4. The clutch 16a may then be engaged, simultaneously locking the interlock mechanism.

In this position, driving connection is from the starter engine 16 through the shaft 17 and the gear 40 to the gear 48, thence from the gear 49 to gear 51, from the gear portion 60 through clutch 66 to the gear portion 61, then through the overrunning clutch 84 to the drive shaft 26. The drive shaft is connected to the starter generator 19 and through the gear portion 64 of the clutch shaft 28, through the clutch 68 to the shaft 38, driving the crankshaft 12 of the engine 10 through the starter gear 14, the reduction or idler gear 15, and the crankshaft gear 13.

Thus, the starter engine is utilized through a three-way driving connection, to both operate the starter-generator as a generator and to start the engine 10, as indicated by the directional arrows of Fig. 4.

After the engine 10 has started, the transmission driveshaft, overrunning the gear train from the starter engine 16, will disconnect automatically at the overrunning clutch 84, as indicated in Fig. 5, and will operate simply to drive the starter generator 19 as a generator.

In case the engine 10 is already warm, it may be started directly by the starter-generator 19, in which case the drive shaft is again disconnected from the starter engine gear train which it overruns. The two way driving possibilities are thus indicated by the directional arrows shown in Fig. 5.

It may be noted that in some cases it will not be feasible to utilize an electric starter-generator for starting the engine 10, in which case a generator instead of a starter-generator will be mounted on the transmission. Consequently, the multiple functions of the transmission will include operation of the generator from either the starter engine 16 or the engine 10, indicated in Figs. 3 and 5, and the starting of the main engine 10 from the starter engine 16, as indicated in Fig. 4. Of course, in such an arrangement, other means must be provided for starting the starter engine 16.

Although we have described but one preferred embodiment of the invention, it will be apparent to one skilled in the art to which the invention pertains that various changes and modifications may be made therein without departing from the spirit of the invention or the scope of the appended claims.

We claim:

1. In an internal combustion engine having a crankshaft provided with a crankshaft gear, a starter gear drivingly connected to the crankshaft gear, a starter-generator system comprising an auxiliary internal combustion starter engine, an electric starter-generator, and an integral starter transmission comprising a transmission driveshaft drivingly connected to said starter-generator, two intermediate gear trains drivingly connected to said starter engine, a plurality of clutches selectively actuated to engage said driveshaft with said starter gear and with either of said gear trains, and a clutch actuating means for simultaneous actuation of said clutches, said clutches operably actuated in one position to engage said driveshaft with one of said gear trains and to disengage said driveshaft from said starter gear and from the other of said gear trains for effecting a two-way driving connection between said starter-generator and said starter engine, said clutches operably actuated in a second position to disengage said driveshaft from the first mentioned gear train and to engage said driveshaft with the starter gear and with the second mentioned gear train for effecting a three-way driving connection between said starter-generator, said starter engine and said crankshaft, and a one-way overrunning clutch connected intermediate said second mentioned gear train and said driveshaft to disengage same when the driveshaft overruns the second mentioned gear train.

2. In an internal combustion engine having a crankshaft provided with a crankshaft gear, a starter gear drivingly connected to the crankshaft gear, a starter-generator system comprising an auxiliary internal combustion starter engine, an electric starter-generator, and an integral starter transmission comprising a transmission housing, a transmission driveshaft longitudinally rotatably supported in said housing, said starter generator supported on said housing and axially drivingly connected and aligned with an end of said driveshaft, said starter gear rotatably supported on said housing adjacent the other end of said driveshaft and having an inner gear element within said housing and axially aligned with said driveshaft, a starter engine shaft rotatably supported by said housing and connected with said starter engine, said shaft disposed parallel to said transmission driveshaft and provided with a gear in said housing, two intermediate gear trains connected together and drivingly connected to said starter engine shaft gear, a plurality of clutches carried by said driveshaft and selectively actuated to engage said driveshaft with said inner gear element and with either of said gear trains, and a clutch actuating means for simultaneous actuation of said clutches and carried in said housing, said clutches operably actuated in one position to engage said driveshaft with one of said gear trains and to disengage said driveshaft from said inner gear element and from the other of said gear trains for effecting a two-way driving connection between said starter-generator and said starter engine, said clutches operably actuated in a second position to disengage said driveshaft from the first mentioned gear train and to engage said driveshaft with the inner gear element and with the second mentioned gear train for effecting a three-way driving connection between said starter-generator, said starter engine and said crankshaft, and a one-way overrunning clutch axially mounted on said drive shaft and operable to disengage said second mentioned gear train from said driveshaft when the driveshaft overruns said second mentioned gear train.

3. In an internal combustion engine having a crankshaft provided with a crankshaft gear, a starter gear drivingly connected to the crankshaft gear, a starter-generator system comprising an auxiliary internal combustion starter engine, an electric starter-generator, and an integral starter transmission comprising a transmission housing, a transmission driveshaft longitudinally rotatably supported in said housing, said starter generator supported on said housing and axially drivingly connected and aligned with the end of said driveshaft, said starter gear rotatably supported on said housing, adjacent the other end of said driveshaft and having an inner gear element within said housing and axially aligned with said driveshaft, a starter engine shaft rotatably supported by said housing and connected with said starter engine, said shaft disposed parallel to said transmission driveshaft and provided with a gear in said housing, two intermediate gear trains connected together and drivingly connected to said starter engine shaft gear, a plurality of clutches axially slidably carried on said driveshaft and selectively axially shifted to engage said driveshaft with said inner gear element and with either of said gear trains, and a clutch actuating means for simultaneous shifting of said clutches, said clutches shifted to one position to engage said driveshaft with one of said gear trains and to disengage said driveshaft from said inner gear element and from the other of said gear trains for effecting a two-way driving connection between said starter-generator and said starter engine, said clutches shifted to a second position to disengage said driveshaft from the first mentioned gear train and to engage said driveshaft with the inner gear element and with the second mentioned gear train for effecting a three-way driving connection between said starter-generator, said starter engine and said crankshaft, and a one-way overrunning clutch axially mounted on said driveshaft and operable to disengage said second mentioned gear train from said driveshaft when the driveshaft overruns said second mentioned gear train from said driveshaft when the driveshaft overruns said second mentioned gear train.

4. In an internal combustion engine having a crankshaft provided with a crankshaft gear, a starter gear drivingly connected to the crankshaft gear, a starter-generator system comprising an auxiliary internal combustion starter engine, an electric starter-generator, and an integral starter transmission comprising a transmission housing, a transmission driveshaft longitudinally rotatably supported in said housing, said starter gear rotatably supported on said housing adjacent the other end of said driveshaft and having an inner gear element within said housing and axially aligned with said driveshaft, a starter engine shaft rotatably supported by said housing and connected with said starter engine, said shaft disposed parallel to said transmission driveshaft and provided with a gear in said housing, a lay shaft rotatably supported in said housing intermediate and parallel with said driveshaft and said starter engine shaft, said lay shaft drivingly connected to said starter engine shaft, two intermediate gear trains drivingly connected to said lay shaft and disposed intermediate said lay shaft and said driveshaft, a plurality of clutches carried by said driveshaft and selectively actuated to engage said driveshaft with said inner gear element and with either of said gear trains, and a clutch actuating means for simultaneous actuation of said clutches and carried in said housing, said clutches operably actuated in one position to engage said driveshaft with one of said gear trains and to disengage said driveshaft from said inner gear element and from the other of said gear trains for effecting a two-way driving connection between said starter-generator and said starter engine, said clutches operably actuated in a second position to disengage said driveshaft from the first mentioned gear train and to engage said driveshaft with the inner gear element and with the second mentioned gear train for effecting a there-way driving connection between said starter-generator, said starter engine and said crankshaft, and a one-way overruning clutch axially mounted on said driveshaft and operable to disengage said second mentioned gear train from said driveshaft when the driveshaft overruns said second mentioned gear train.

5. In an internal combustion engine having a crankshaft provided with a crankshaft gear, a starter gear drivingly connected to the crankshaft gear, a starter-generator system comprising an auxiliary internal combustion starter engine, an electric starter-generator, and an integral starter transmission comprising means selectively drivingly connecting said starter engine with said starter-generator, means selectively drivingly connecting said starter gear simultaneously with said starter engine and said starter-generator, and means automatically disconnecting said starter engine from said starter-generator and said starter gear when the first engine overruns said starter engine, and drivingly connecting said starter gear only with said starter-generator to provide a higher driving speed transmission ratio when said starter engine is driving said starter gear than the driving speed transmission ratio provided when the starter-generator is driving said starter gear.

6. In an internal combustion engine having a crankshaft provided with a crankshaft gear, a starter gear drivingly connected to the crankshaft gear, a starter-generator system comprising an auxiliary internal combustion starter engine, an electric starter-generator, and an integral starter transmission comprising a transmission driveshaft drivingly connected to said starter-generator, two intermediate gear trains drivingly connected to said starter engine, a plurality of clutches selectively actuated to engage said drive shaft with said starter gear and with either of said gear trains, and a clutch actuating means for simultaneous actuation of said clutches, a clutch means selectively actuated to engage said gear trains with said starter engine, and means interconnecting said first clutch actuating means with said last mentioned clutch means and operable by same to lock said actuating means against actuation of said first mentioned clutches when said gear trains are engaged with said starter engine.

7. In an internal combustion engine having a crankshaft provided with a crankshaft gear, a starter gear drivingly connected to the crankshaft gear, a starter-generator system comprising an auxiliary internal combustion starter engine, an electric starter-generator, an integral starter transmission comprising a transmission driveshaft drivingly connected to said starter-generator, a gear train drivingly connected with said starter engine, a clutching means relatively actuated to one position to engage said driveshaft only with said gear train, said clutching means selectively actuated to a second position to engage said driveshaft with said starter gear and with said gear train, means automatically disconnecting said gear train from said driveshaft when the first engine overruns said starter engine, a second clutching means selectively actuated to disengage said starter engine from said gear train, and an interlock mechanism operably connected with said first and said second clutching means and actuated automatically by said second clutching means to lock said first clutching means against actuation only while said starter engine is engaged with said gear train.

References Cited in the file of this patent
UNITED STATES PATENTS
2,180,612    Schlenker ---------------- Nov. 21, 1939